United States Patent
Tsuzuki et al.

(10) Patent No.: US 6,499,371 B2
(45) Date of Patent: Dec. 31, 2002

(54) RANGE SWITCHING DEVICE

(75) Inventors: Shigeo Tsuzuki, Anjo (JP); Kazuo Takemoto, Anjo (JP); Naoki Ohkoshi, Anjo (JP); Yoshitaka Murase, Anjo (JP); Hirotoshi Eishima, Anjo (JP); Jiro Maeda, Anjo (JP)

(73) Assignee: Aisin Aw Co., Ltd., Anjo (JP)

( * ) Notice: Subject to any disclaimer, the term of this patent is extended or adjusted under 35 U.S.C. 154(b) by 0 days.

(21) Appl. No.: 09/913,316

(22) PCT Filed: Dec. 13, 2000

(86) PCT No.: PCT/JP00/08787

§ 371 (c)(1),
(2), (4) Date: Aug. 10, 2001

(87) PCT Pub. No.: WO01/42687

PCT Pub. Date: Dec. 13, 2000

(65) Prior Publication Data

US 2002/0134185 A1 Sep. 26, 2002

(30) Foreign Application Priority Data

Dec. 13, 1999 (JP) .............................. 11-353557
Dec. 12, 2000 (JP) ....................... 2000-376875

(51) Int. Cl.$^7$ .............................................. F16H 59/00
(52) U.S. Cl. .................................... 74/335; 74/473.12
(58) Field of Search ............................... 74/335, 473.12

(56) References Cited

U.S. PATENT DOCUMENTS

| 4,291,586 | A | * | 9/1981 | Buetemeister ............... 74/335 |
| 5,180,959 | A | | 1/1993 | Christopher |
| 5,881,853 | A | * | 3/1999 | Peuster et al. ............. 192/3.56 |
| 5,901,608 | A | | 5/1999 | Takeyama |

FOREIGN PATENT DOCUMENTS

| JP | H07-16067 | | 3/1995 |
| JP | 7-253150 | A | 10/1995 |
| JP | 11-192856 | A | 7/1999 |
| JP | 2000-35127 | A | 2/2000 |
| JP | 2000-74211 | A | 3/2000 |

* cited by examiner

Primary Examiner—Dirk Wright
(74) Attorney, Agent, or Firm—Oliff & Berridge, PLC

(57) ABSTRACT

A range switching apparatus is provided with a pair of discs defining, an engagement groove therebetween, a pin, and an arm portion which are used for switching to a desired drive range; a motor for driving the discs, the engagement groove, the pin, and the arm portion used for switching the drive range; a speed reducing gear mechanism for reducing a drive force of the motor and transmitting the drive force to the discs, the engagement groove, the pin, and the arm portion, used for switching the drive range; and an electromagnetic clutch for engaging and disengaging a power transmission state between the motor and the speed reducing gear mechanism. An adsorbed disc of the electromagnetic clutch is connected to a power input shaft of the speed reducing gear mechanism.

39 Claims, 6 Drawing Sheets

RANGE SWITCHING DEVICE

TECHNICAL FIELD

The present invention relates to a range switching apparatus used for switching a drive range of, for example, an automatic transmission.

BACKGROUND ART

Conventionally, a range switching apparatus for switching a drive range of an automatic transmission, for example, which has a structure constituted by a valve for switching the drive range within the transmission, for example, a manual valve, and a shift lever connected to the valve by a shift cable and provided within a vehicle cabin has been known. The apparatus is structured such as to switch the manual valve via the shift cable in accordance with an operation by a driver applied to the shift lever.

However, in view of requests for expanded freedom of design within the vehicle cabin in recent motor vehicles, requests for expanded derivative types of motor vehicles produced from the same platform and the like, there is a trend that the expansion of freedom of placing the shift lever is becoming necessary. Accordingly, since the shift cable connecting the shift lever and the manual valve is restricted in view of its layout, the development of a range switching apparatus using no shift cable is desired.

Accordingly, there has been proposed in Japanese Utility Model Publication No. HEI 7-16067 and the like a range switching apparatus in which a range switching operation is performed by using an electric motor and an electromagnetic clutch.

The range switching apparatus has two motors comprising first and second motors, and a planetary gear mechanism. The first motor is connected to a sun gear in the planetary gear mechanism via a worm gear and a clutch. The second motor is connected to a planetary gear via a worm gear. Generally, the structure is made such that the second motor is stopped, a plurality of planetary gears do not move around the sun gear, and a torque of the first motor can be output from a ring gear surrounding a plurality of planetary gears and engaged with the planetary gears. The structure is made such that the output torque is further transmitted to a range control shaft (a shaft connected to the manual valve) via a speed reduction mechanism. Further, the second motor is structured such as to be driven when the first motor fails; however, since the first motor and the second motor are interlocked with each other via the planetary gears, they are not affected by one other.

Further, a range switching apparatus provided with a function of detecting a switching position of the manual valve is disclosed in Japanese Patent No. 2904290. This range switching apparatus is also structured so as to switch the manual valve in the automatic transmission by a motor. Further, an electromagnetic clutch is provided between the motor and a manual valve. Further, a position sensor for detecting the switching position of the manual valve is provided in the motor.

However, the range switching apparatus disclosed in Japanese Utility Model Publication No. HEI 7-16067 has the following problems.

First, since there are provided two motors and a planetary gear mechanism for transmitting the torque of the two motors, the structure is complex. Accordingly, the size of the range switching apparatus is increased.

Further, since two worm gears correspond to the two motors, the planetary gears and the ring gear are supported in a casing of the range switching apparatus and supported on a gear shaft which does not transmit power, the size of the range switching apparatus is further increased.

Further, the electric motor corresponding to a drive source is connected to an adsorbed disc in the electromagnetic clutch, and an adsorption rotor forming a magnetic field of the electromagnetic clutch is connected to a gear speed reduction mechanism in the side of a detent lever. Generally, since the adsorption rotor is formed so that the mass of the adsorption rotor is significantly greater than that of the adsorbed disc, an inertia of the adsorption rotor connected to the side of the detent lever is large even when the clutch is disengaged at a predetermined position, so that there is sometimes generated trouble in which the detent lever is rotated via the gear speed reduction mechanism due to an inertia force of the adsorption rotor so as to pass through the required shift range.

This tendency is significantly generated in the case where the driver operates the shift lever and drives the electric motor at a high speed so as to complete the range switching motion without delay and obtain a good shift feeling, and can not be ignored. That is because the revolution speed of the electromagnetic clutch connected to the electric motor becomes faster than the revolution speed of the electric motor and the inertia force of the adsorption rotor is increased that amount.

In order to solve the problems mentioned above, a method of adjusting a disengagement timing of the clutch is conceivable; however, if the inertia force of the adsorption rotor is large, it is necessary to disengage the clutch before a roller of the detent spring goes over a projection immediately before a range engagement groove formed so as to correspond to respective shift positions of the detent lever. In this case, it is indefinite whether or not the roller of the detent spring is securely received within a target range engagement groove, and the apparatus lacks reliability.

Further, since the position sensor in the apparatus switching the manual valve which is disclosed in Japanese Patent No. 2904290 is provided in the motor, only an angle of rotation of the motor can be detected. Accordingly, since it is impossible to directly detect the position of the range control shaft for operating the manual valve when disengaging the clutch, it is impossible to accurately control the switching position of the manual valve.

In view of the matters mentioned above, it is an object of the present invention to provide a compact range switching apparatus having a simple structure.

An object of the present invention is to provide a range switching apparatus of an automatic transmission which can reliably switch to a target range position, can realize a good shift feeling, and has high reliability.

An object of the present invention is to provide a range switching apparatus for reliably detecting a range switching position.

DISCLOSURE OF THE INVENTION

The invention as defined in claim 1 includes range switching means for switching a range; driving means for driving the range switching means; speed reducing means for reducing a drive force of the driving means and transmit the drive force to the range switching means; and a clutch for connecting and disconnecting a power transmitting state between the driving means and the speed reducing means, wherein a power output member of the clutch is connected to a power input member of the speed reducing means.

Accordingly, since the power output member of the clutch is directly connected to the power input member of the speed reducing means via no other members, it is possible to make the range switching apparatus compact.

Further, since the clutch is provided on the side of the driving means rather than on the side of the speed reducing means, a torque amplified by the speed reducing means is not applied to the clutch, so that a capacity of the clutch can be reduced and it is possible to make the range switching apparatus compact.

The invention as defined in claim 2 is dependent on claim 1, and further includes a position detecting sensor for detecting a range switching position of the range switching means between the range switching means and the speed reducing means.

Accordingly, since the range switching position of the range switching means is detected by the position detecting sensor between the range switching means and the speed reducing means, it is possible to reliably detect the switching position by the range switching means.

The invention as defined in claim 3 is dependent on claim 2, and is such that the position detecting sensor detects a motion of the power output member of the speed reducing means.

Accordingly, since the position detecting sensor detects the motion of the power output member in the speed reducing means, there is no effect from backlash of the speed reducing means so it is possible to increase the detecting accuracy of the position of the range switching means.

The invention as defined in claim 4 is dependent on claim 1 or claim 2, and is such that the clutch is an electromagnetic clutch having an adsorbed disc and an adsorption rotor with a mass greater than that of the adsorbed disc, the power output member of the clutch is made the adsorbed disc, and the power input member of the clutch is made the adsorption rotor.

Accordingly, since, among the adsorbed disc and the adsorption rotor having a mass greater than that of the adsorbed disc which constitute the electromagnetic clutch, the adsorbed disc, which has a small mass and is little affected by the inertia force accompanying the rotation, is connected to the range switching means and the adsorption rotor, which has a large mass and is greatly affected by the inertia force accompanying the rotation, is connected to the driving motor, it is possible to reliably and easily execute the range switching motion without being affected by the inertia force of the adsorption rotor. That is, it is possible to prevent in advance an erroneous operation, such as where the inertia force of the adsorption rotor is transmitted to the side of the range switching means so as to pass through the required range after the electromagnetic clutch is disengaged, thereby making it possible to increase the accuracy of switching the range.

Since it is possible to eliminate the influence of the inertia force of the adsorption rotor, it is possible to rotate the driving motor at a high speed, complete the range switching motion in a state where the possibility of the erroneous motion mentioned above is eliminated without delay after the driver operates the shift lever, and obtain a good shift feeling.

The invention as defined in claim 5 includes range switching means for switching a range; driving means for driving the range switching means; and a clutch for connecting and disconnecting a power transmitting state between the driving means and the range switching means. Further, the clutch has an adsorbed disc and an adsorption rotor having a mass greater than that of the adsorbed disc, the adsorbed disc is provided on the side of the range switching means, and the adsorption rotor is provided on the side of the driving means.

Accordingly, since, among the adsorbed disc and the adsorption rotor having a mass greater than that of the adsorbed disc which constitute the electromagnetic clutch, the adsorbed disc, which has a small mass and is little affected by the inertia force accompanying the rotation, is arranged on the side of the range switching means and the adsorption rotor, which has a large mass and is greatly affected by the inertia force accompanying the rotation, is arranged on the side of the driving motor, it is possible to reliably and easily execute the range switching motion without being affected by the inertia force of the adsorption rotor. That is, it is possible to prevent in advance an erroneous operation, such as where the inertia force of the adsorption rotor is transmitted to the side of the range switching means so as to pass through the required range after the electromagnetic clutch is disengaged, thereby making it possible to increase the accuracy of switching the range.

Since it is possible to eliminate the influence of the inertia force of the adsorption rotor, it is possible to rotate the driving motor at a high speed, complete the range switching motion in a state where the possibility of the erroneous motion mentioned above is eliminated without delay after the driver operates the shift lever, and obtain a good shift feeling.

The invention as defined in claim 6 is dependent on claim 5, and further includes a position detecting sensor for detecting a range switching position of the range switching means between the range switching means and the clutch.

Accordingly, since the range switching position of the range switching means is detected by the position detecting sensor between the range switching means and the clutch, it is possible to reliably detect the switching position by the range switching means.

The invention as defined in claim 7 includes range switching means for switching a range; driving means for driving the range switching means; a clutch for connecting and disconnecting a power transmitting state between the range switching means and the driving means; and a position detecting sensor for detecting the range switching position of the range switching means between the range switching means and the clutch.

Accordingly, since the range switching position of the range switching means is detected by the position detecting sensor between the range switching means and the clutch, it is possible to accurately detect the switching position by the range switching means.

The invention as defined in claim 8 is dependent on any one of claims 2, 6, or 7, and is such that the position detecting sensor detects a motion of the power input member (5a) of the range switching means.

Accordingly, since the position detecting sensor detects the motion of the power input member in the range switching means, there is no effect from backlash of the speed reducing means so it is possible to increase the detecting accuracy of the range switching means.

The invention as defined in claim 9 is dependent on any one of claims 1 through 8, and is such that the range switching means includes a detent mechanism for holding at each position corresponding to the range.

Accordingly, it is possible to securely hold the range switching position by the detent mechanism. Particularly, in the case that, among the adsorbed disc and the adsorption rotor having a mass greater than that of the adsorbed disc which constitute the electromagnetic clutch, the adsorbed disc, which has a small mass and is little affected by the inertia force accompanying the rotation, is connected to the range switching means and the adsorption rotor, which has a large mass and is greatly affected by the inertia force accompanying the rotation, is connected to the driving motor, it is possible to securely and easily hold the range switching position without being affected by the inertia force of the adsorption rotor. That is, it is possible to prevent in advance an erroneous operation, such as where the inertia force of the adsorption rotor is transmitted to the side of the range switching means so as to pass through the required range after the electromagnetic clutch is disengaged, thereby making it possible to increase the accuracy of switching the range.

Further, since it is possible to eliminate the influence of the inertia force of the adsorption rotor, it is possible to rotate the driving motor at a high speed, complete the range switching motion in a state where the possibility of the erroneous motion mentioned above is eliminated without delay after the driver operates the shift lever, and obtain a good shift feeling.

Further, in the case that the detent mechanism is, for example, as that of the conventional art, provided with a detent spring having an elasticity, a roller provided at a front end of the detent spring and a range engagement groove with which the roller is engaged, it is not necessary to execute a control of the clutch disengaging timing which is complex and lacks reliability so that the clutch is disengaged before the roller in the detent spring goes over the projection immediately before the range engagement groove formed so as to correspond to each of the shift positions of the detent lever, thus making it is possible to provide the range switching apparatus having a high reliability.

The invention as defined in claim 10 is dependent on any one of claims 2, 3, 6, 7, or 8, and further includes range selecting means for selecting the range; and range switching control means for operating and controlling the driving means and the clutch so as to make the range switching means execute a switching operation, thereby switching to a range selected by the range selecting means when a range switching position according to the range switching means which is detected by the position detecting sensor is different from a range selected by the range selecting means.

Accordingly, when the range switching position according to the range switching means which is detected by the position detecting sensor is different from the range selected by the range selecting means, the range selecting means operates and controls the driving means and the electromagnetic clutch so as to make the range switching means execute the switching operation, thus making it is possible to freely select a place for disposing the range selecting means.

The invention as defined in claim 11 is dependent on any one of claims 1 through 10, and is such that a casing of the apparatus is mounted to an automatic transmission and the clutch is arranged in a cover of the automatic transmission at a predetermined interval.

Accordingly, since the clutch is arranged apart from the cover of the automatic transmission by a predetermined gap, it is possible to prevent a situation in which a property of the clutch is changed due to heat generated by the automatic transmission and transmitted from the cover from occurring, such that a structure having high reliability can be achieved.

The invention as defined in claim 12 is dependent on any one of claims 1 through 11, and is such that the driving means is a driving motor, and a worm connected to the driving motor and a worm wheel connected to the power inputting member of the clutch are provided in an engaged state.

Accordingly, since the speed of rotation of the driving means is reduced by the worm and the worm wheel, the range switching means is not made to execute an extra switching operation via the clutch even when the driving means rotates somewhat excessively.

The invention as defined in claim 13 is dependent on any one of claims 1 through 12, and is such that the power inputting member of the clutch is connected to a hollow input shaft rotatably supported in the casing. Then, the power inputting member of the speed reducing means is inserted into the input shaft.

Accordingly, since the output shaft and the input shaft are arranged in a telescopic manner, it is possible to reduce the size of the apparatus in an axial direction so as to make the apparatus compact, arrange the output shaft and the input shaft in the same side with respect to the clutch, for example, on a right side in FIG. 2, arrange the speed reducing means and the driving motor in so as to be aligned on the same side such as the right side in FIG. 2 with respect to the clutch, and make the apparatus compact.

The invention as defined in claim 14 is dependent on any one of claims 1 through 13, and is such that the power input member of the speed reducing means is rotatably supported in the input shaft. Further, one end of the power input member is rotatably supported in the casing.

Accordingly, it is possible to securely support the power input member of the speed reducing means in the casing.

The invention as defined in claim 15 is dependent on any one of claims 1 through 4 or 9 through 14, and is such that the power input member of the speed reducing means has an input gear and a connection shaft. Further, the connection shaft has the input gear at one end, and both ends are supported in the casing and the input shaft by supporting members. Further, one supporting member is arranged at one end of the connection shaft so as to be supported in the casing, and another supporting member is supported in the input shaft.

Accordingly, it is possible to securely support the connection shaft of the speed reducing means in the casing.

The invention as defined in claim 16 is dependent on any one of claims 13 through 15, and is such that the input shaft has a worm wheel at one end and is supported in the casing.

Accordingly, it is possible to securely support the connection shaft in the casing and securely maintain engagement between the worm and the worm wheel.

The invention as defined in claim 17 is dependent on any one of claims 1 through 15, and is such that one supporting member among a plurality of supporting members of the connection shaft is arranged at a position overlapping with the worm wheel.

Accordingly, the supporting member is arranged on an inner peripheral side of the worm wheel, whereby it is possible to securely support the worm wheel.

The invention as defined in claim 18 is dependent on any one of claims 11, or 13 through 16, and is such that the power input member of the clutch is positioned at an end portion of the input shaft. Further, it is supported in the casing at a position between the power input member of the clutch and the worm wheel.

Accordingly, since the power input member of the clutch is positioned at the end portion of the input shaft and is supported in the casing at a position between the power input member of the clutch and the worm wheel, it is possible to support the driving motor and the clutch with an improved weight balance and stabilize the motion of the range switching apparatus.

The invention as defined in claim 19 is dependent on claim 1 or 11, and is such that the power input member of the speed reducing means is formed to be hollow and is rotatably supported in the casing. Further, an input shaft of the clutch having the power input member of the speed reducing means is inserted into the power input member.

Accordingly, since the power input member and the input shaft are arranged in a telescopic manner, it is possible to reduce the size of the apparatus in the axial direction so as to make the apparatus compact, arrange the power input member and the input shaft on the same side with respect to the clutch, for example, on the right side in FIG. 6, arrange the speed reducing means and the driving motor so as to be aligned on the same side such as the right side in FIG. 6 with respect to the clutch, and make the apparatus compact.

The invention as defined in claim 20 is dependent on claim 19, and is such that the input shaft of the clutch is rotatably supported in the power input member of the speed reducing means. Further, one end of the input shaft of the clutch is rotatably supported in the casing.

Accordingly, it is possible to securely support the power input member of the speed reducing means in the casing.

The invention as defined in claim 21 is dependent on claim 19 or 20, and is such that the input shaft of the clutch has a worm wheel arranged at one end and supporting members arranged on both sides of the worm wheel. Further, one supporting member is supported in the casing, and another supporting member is supported in the power input member of the speed reducing means.

Accordingly, it is possible to securely support the input shaft in the casing.

The invention as defined in claim 22 is dependent on any one of claims 19 through 21, and is such that the power input member of the speed reducing means has a hollow connection shaft and an input gear. Further, the connection shaft has the input gear at one end, is supported in the casing by a supporting member, and has a plurality of supporting members supporting the input shaft on an inner periphery.

Accordingly, it is possible to securely support the power input member of the speed reducing means in the input shaft.

The invention as defined in claim 23 is dependent on claim 22, and is such that one supporting member among a plurality of supporting members provided on the inner periphery of the connection shaft of the speed reducing means is arranged at a position overlapping with the input gear.

Accordingly, the supporting member is arranged on an inner peripheral side of the input gear, whereby it is possible to securely support the input gear.

The invention as defined in claim 24 is dependent on any one of claims 11, or 19 through 23, and is such that the connection shaft of the speed reducing means has an input gear at one end portion and has a power output member of the clutch at another end portion. Further, it is supported in the casing at a position between the input gear and the power output member of the clutch.

Accordingly, since the connection shaft of the speed reducing means has the input gear at one end portion, the power output member of the electromagnetic clutch at another end portion, and is supported in the casing at a position between the input gear and the power output member of the electromagnetic clutch, it is possible to support the driving motor and the clutch with an improved weight balance and stabilize the motion of the range switching apparatus.

The invention as defined in claim 25 is dependent on any one of claims 1 through 24, and is such that the range switching means operates a switching valve for switching a shift range of an automatic transmission.

Accordingly, the range switching apparatus can be provided in an automatic transmission to be mounted in a vehicle.

BEST MODE FOR CARRYING OUT THE INVENTION

A description will be given below of an embodiment in accordance with the present invention with reference to the accompanying drawings.

Figure 1:
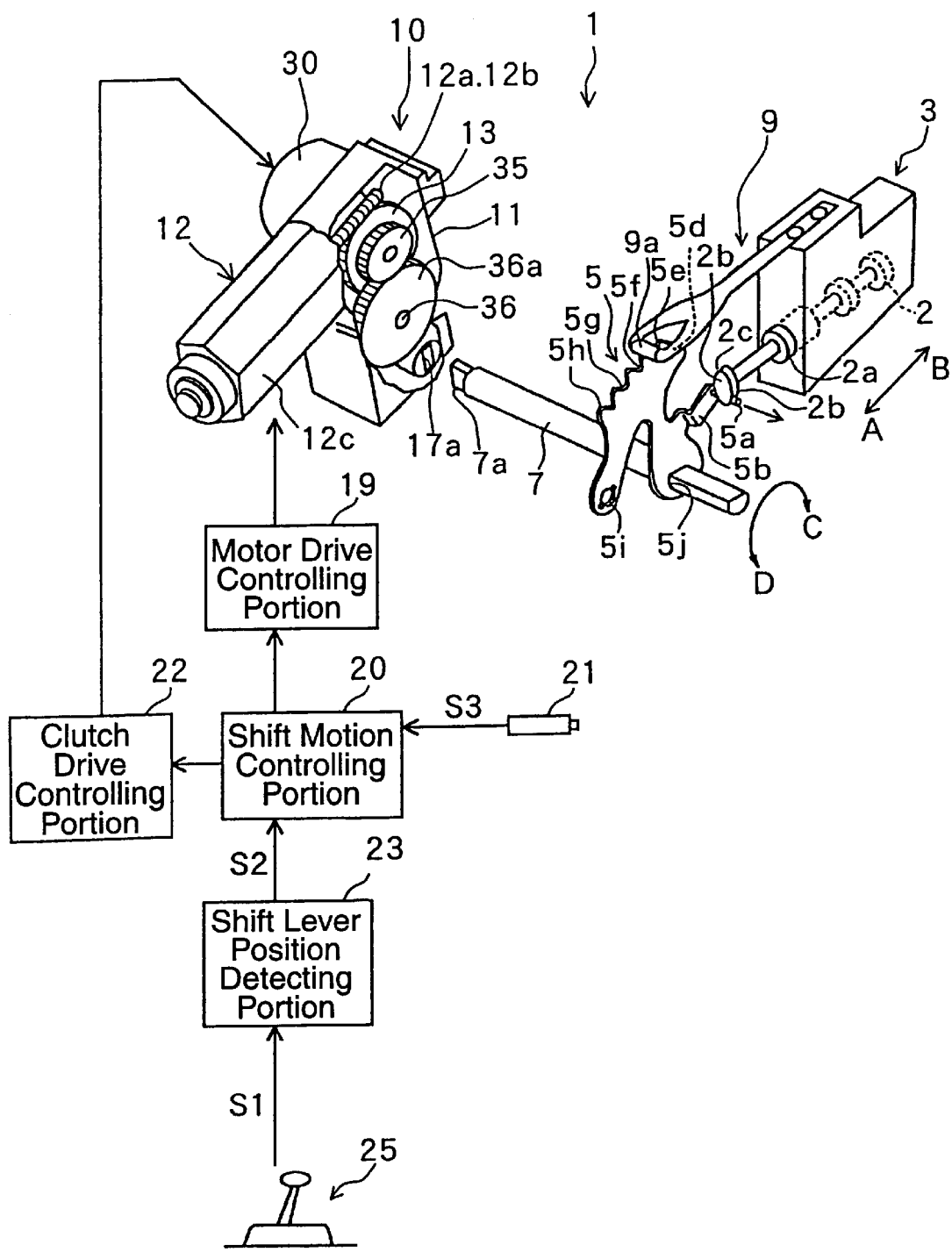
FIG. 1 is a schematic view showing an example of a range switching apparatus.

FIG. 1 shows an example of a range switching apparatus 1 in accordance with a first embodiment of an automatic transmission. The range switching apparatus 1 has a manual valve 2 corresponding to a switching valve constituting a part of an automatic transmission (not shown) such as a multistage type automatic transmission, a continuously variable transmission (CVT) or the like. The manual valve 2 is housed in a valve body 3 constituting a part of a cover 8 of the automatic transmission. The manual valve 2 is provided so as to freely move in a direction of an arrow A-B corresponding to an axial direction of a spool 2a of a valve within the valve body 3. The automatic transmission is structured such as to be sequentially switched to P, N, D and Ds ranges from a side of the arrow A toward a side of the arrow B by moving the manual valve in the direction. of the arrow A-B and positioning at a predetermined position.

Figure 3:
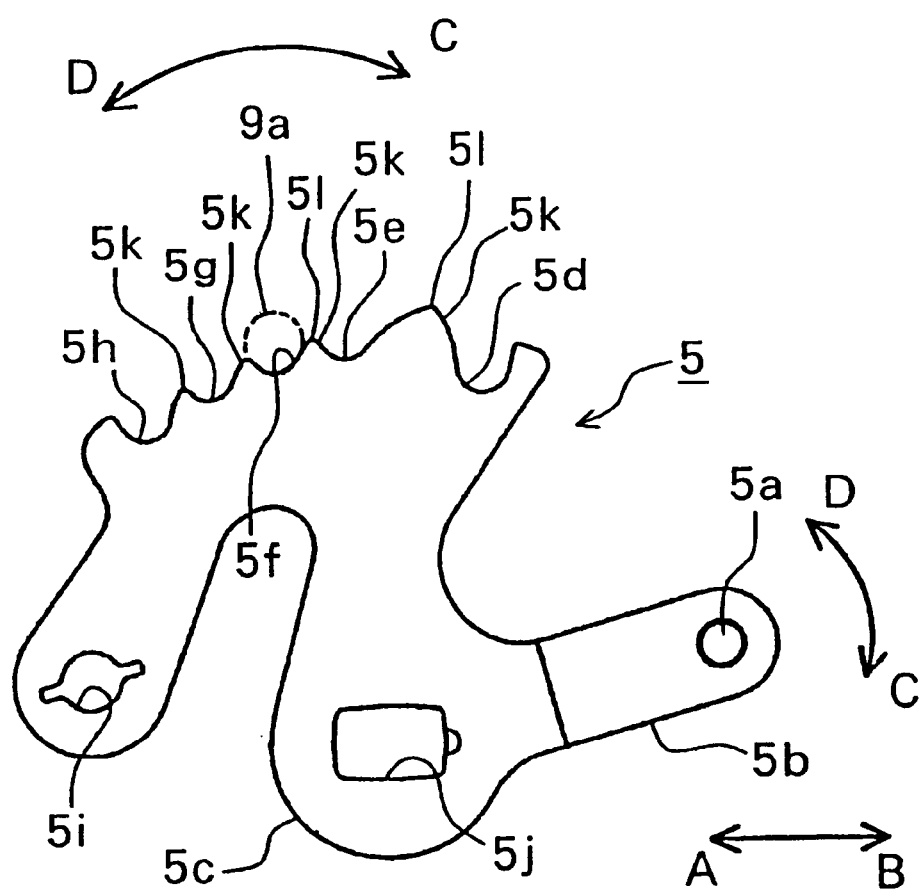
FIG. 3 is a view showing an example of a detent lever.

An engagement groove 2c constituted by two discs 2b and 2b is formed at a front end on the side of the arrow A of the manual valve 2. A detent lever 5 is engaged with the engagement groove 2c via a pin 5a provided in an arm portion 5b of the detent lever 5. The detent lever 5 has a plate-like main body 5c as shown in FIG. 3. Five range engagement grooves 5d, 5e, 5f, 5g and 5h are formed in an upper portion in the drawing of the main body 5c at predetermined intervals. The respective range engagement grooves 5d, 5e, 5f, 5g and 5h are sequentially arranged from the right side to the left side in the drawing in such a manner as to correspond to the ranges "P", "R", "N", "D" and "Ds" of the automatic transmission. Further, the arm portion 5b provided with the pin 5a mentioned above is protruded and formed on the right side in the drawing of the main body 5c. A parking rod engagement hole 5i for driving a parking mechanism in a P range (not shown) is pierced through on a left side in the drawing of the main body 5c. Further, a rectangular engagement hole 5j into which a range controlling shaft 7 mentioned below is inserted is formed through in a substantially center portion of the main body 5c.

A detent spring 9 constituted by a leaf spring and fixed to the valve body 3 or a casing of the automatic transmission or the like at one end is provided, as shown in FIG. 1, in an upper portion of five range engagement grooves 5d, 5e, 5f, 5g and 5h in the main body 5c in such a manner as to be urged toward a lower portion in the drawing due to its own elasticity in a state of fitting and engaging a roller 9a rotatably supported to a front end with respect to any one of five range engagement grooves 5d, 5e, 5f, 5g and 5h. Further, the range controlling shaft 7 formed in a rod shape is engaged with an engagement hole 5j of the main body 5c so as to be integrated with the detent lever 5.

Figure 2:
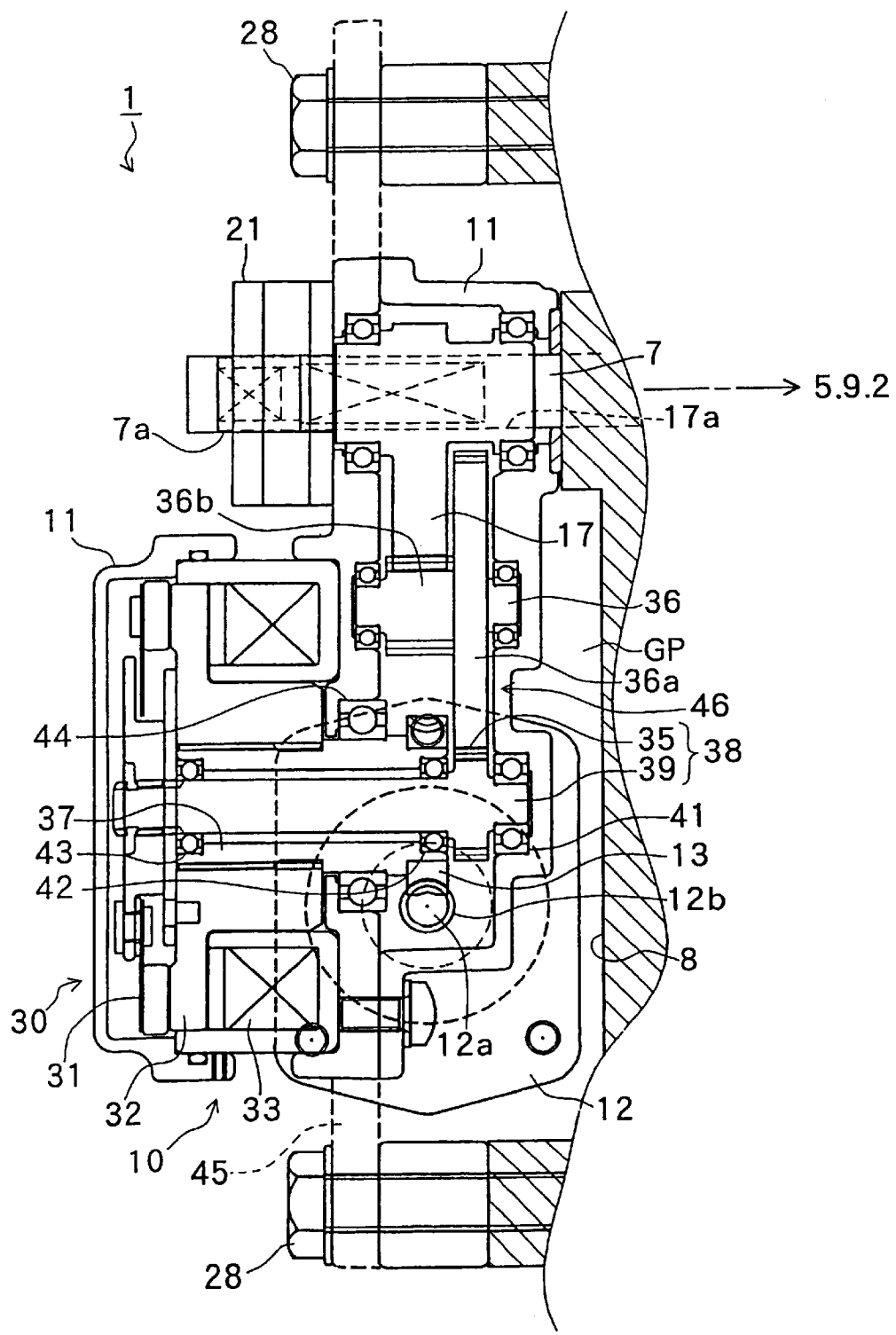
FIG. 2 is a front view showing an example of a driving portion of the range switching apparatus.

An engagement portion 7a having a rectangular cross section is formed in a front end portion on the left side in FIG. 1 of the range controlling shaft 7. A valve driving apparatus 10 is connected to the engagement portion 7a. The valve driving apparatus 10 is mounted on a cover 8 of the automatic transmission or the like via a bolt 28 or the like as shown in FIG. 2. The valve driving apparatus 10 has a casing 11 formed in a box shape as shown in FIGS. 1 and 2. A driving motor 12 is attached to the casing 11. A worm 12b is attached to an output shaft 12a of the driving motor 12.

A worm wheel 13 attached to an input shaft 37 of an electromagnetic clutch 30 attached to a left side in FIG. 2 of the casing 11 is engaged with the worm 12b. The input shaft 37 is formed in a cylindrical shape. An adsorption rotor 32 constituting the electromagnetic clutch 30 is provided in a left end in FIG. 2 of the input shaft 37 in a state of being spline connected. An exciting coil 33 is provided on an outer peripheral portion of the adsorption rotor 32.

Further, a power input shaft 38 of a speed reducing gear mechanism 46 mentioned below is rotatably supported on an inner periphery of the input shaft 37 so as to be arranged in a telescopic manner and a concentric manner with respect to the input shaft 37. The power input shaft 38 is formed by a connection shaft 39 and a small gear 35 provided on one end of the connection shaft 39. One end of the connection shaft 39 is supported in the casing 11 by a bearing 41. Another end of the connection shaft 39 is supported in the input shaft 27 by bearings 42 and 43. One bearing 42 among a plurality of bearings 41, 42 and 43 of the connection shaft 39 is arranged at a position overlapping with the worm wheel 13 in an axial direction.

A adsorbed disc 31 is connected to a left end of the power input shaft 38 of the speed reducing gear mechanism 46. The adsorption rotor 32 and the adsorbed disc 31 face each other, and are provided so as to be freely adsorbed and released to each other by exciting the exciting coil 33 or canceling the excitation of the exciting coil 33. In this case, the valve driving apparatus 10 including the electromagnetic clutch 30 is arranged with respect to the cover 8 of the automatic transmission via a gap GP, thereby eliminating influence of heat generated by the automatic transmission and transmitted from the cover 8.

A large gear 36a of a middle shaft 36 rotatably supported to the casing 1 is engaged with a small gear 35 formed in the connection shaft 39 of the power input shaft 38. A small gear 36b is formed in the middle shaft 36. An output gear 17 formed in a fan shape as a whole is engaged with the small gear 36b. The output gear 17 is rotatably supported in the casing 11. Further, a rectangular engagement hole 17a is pierced in a center portion of the output gear 17 (refer to FIG. 1). The engagement portion 7a of the range control shaft 7 mentioned above is fitted to and engaged with the engagement hole 17a.

In this case, since the power input shaft 38 of the speed reducing gear mechanism 46 is arranged within the input shaft 37 of the electromagnetic clutch 30 in a telescopic manner and a concentric manner, and the input shaft 37 and the power input shaft 38 of the speed reducing gear mechanism 46 are taken out in the same direction such as to the right in FIG. 2 or the like, gear trains such as the small gear 35 of the electromagnetic clutch 30, the large gear 36a and the small gear 36b of the middle shaft 36, the output gear 17 and the like constituting the speed reducing gear mechanism 46, and the driving motor 12 are arranged in a state of being aligned in a vertical direction in the figure, as shown in FIG. 2.

A motor drive controlling portion 19 is connected to the driving motor 12 as shown in FIG. 1. A shift motion controlling portion 20 is connected to the motor drive controlling portion 19. A position sensor 21 provided in the casing 11 for detecting a position of the range controlling shaft 7, that is, the detent lever 5, a clutch drive controlling portion 22, and a shift lever position detecting portion 23 are connected to the shift motion controlling portion 20. A shift lever 25 (or a shift switch or the like) corresponding to shift instructing means is connected to the shift lever position detecting portion 23.

The position detecting sensor 21 is structured such as to detect a switching position of the detent lever 5 between the detent lever 5 and the speed reducing gear mechanism 46. That is, the position sensor 21 may be provided in any place except the range controlling shaft 7 as far as it can detect an angle of rotation of the range controlling shaft 7 or the present position of the detent lever 5.

The casing 11 is supported between the adsorption rotor 32 and the worm wheel 13 by the supporting plate 45 and is mounted to the cover 8 of the automatic transmission.

Figure 5:
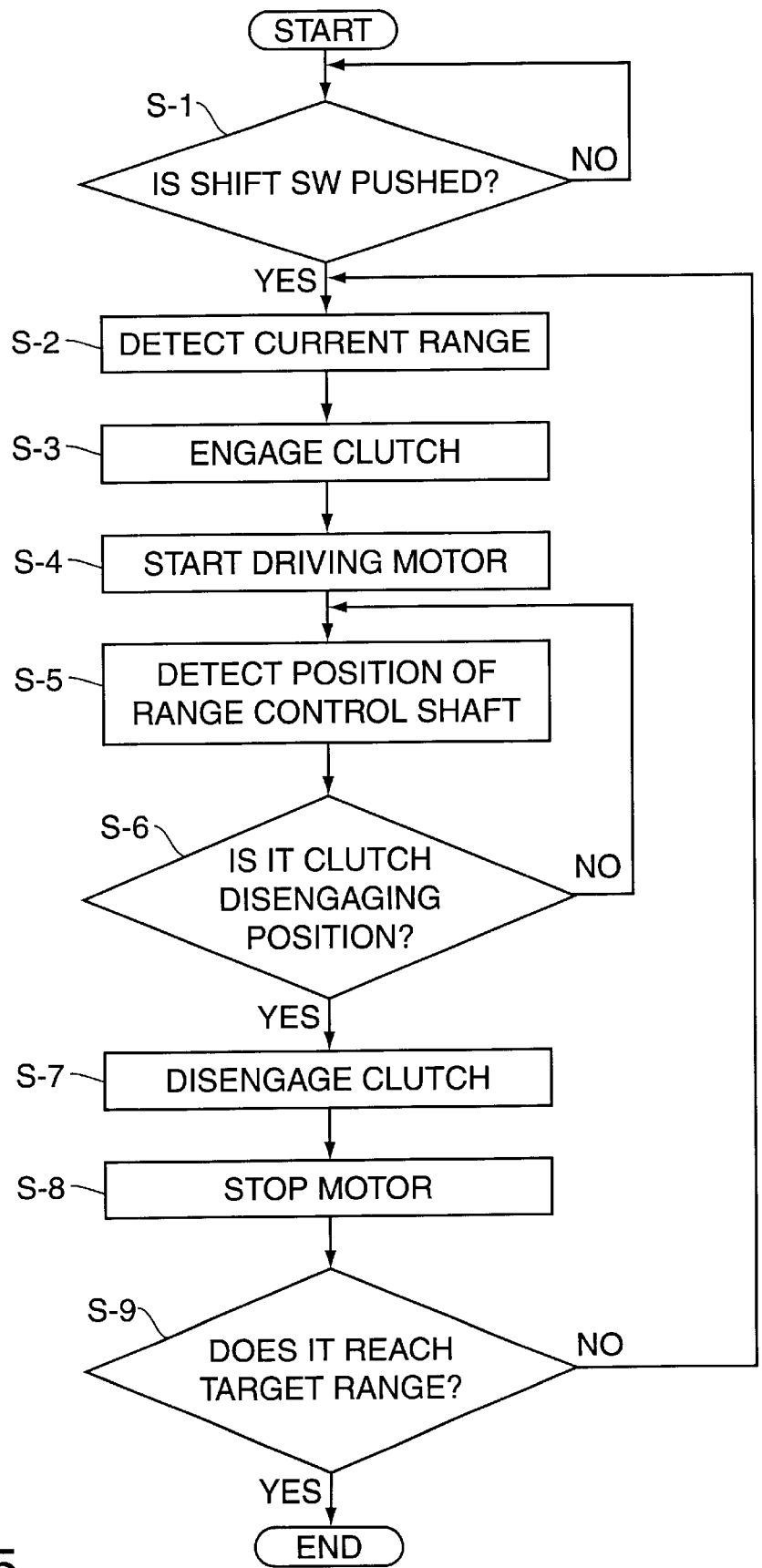
FIG. 5 is a flow chart for explaining a motion of the range switching apparatus.

Since the range switching apparatus 1 is structured in the manner mentioned above, the shift motion controlling portion 20 judges during the operation of the vehicle via the shift lever position detecting portion 23 whether or not the position of the shift lever 25 is changed due to the operation of the driver (refer to a flow chart in FIG. 5 (S-1)). A shift signal SI is output as an electric signal to the shift lever position detecting portion 23 from the shift lever 25 in correspondence to the shift position. The shift lever position detecting portion 23 calculates the shift position selected by the shift lever 25 at present on the basis of the signal S1 so as to output as a shift position signal S2 to the shift motion controlling portion 20. Accordingly, the shift motion controlling portion 20 can easily judge by monitoring the shift position signal S2 whether or not the shift lever position has changed (S-2).

In the case that it is judged by the shift motion controlling portion 20 that the shift lever position has changed, it is judged by comparing the shift position (refer to a "current shift position) selected by the shift lever 25 at present with a shift position selected as a result of changing the position of the shift lever (refer to a "target shift position") whether or not the driving motor 12 should be normally rotated in order to move the shift position from the current shift position to the target shift position.

That is, since the range position of the manual valve 2 is set linearly along the direction of the arrow A-B as shown in FIG. 1, it is necessary to judge on the basis of the relation of the range position between the current shift position and the target shift position whether the motor 12 is normally rotated or reverse rotated. Here, in the case of switching the range in a direction of P→R→N→D, for example, switching from the R range to the D range via the N range, the shift motion controlling portion 20 judges that the driving motor 12 is normally rotated, and conversely, in the case of switching the range in the direction of D→N→R→P, for example, switching from the D range to the P range via the N and R ranges, the shift motion controlling portion 20 judges that the driving motor 12 is reverse rotated.

In the manner mentioned above, when the direction of rotation of the driving motor 12 is judged by the shift motion controlling portion 20, the shift motion controlling portion 20 gives a command to connect the electromagnetic clutch 30 to the clutch drive controlling portion 22, and gives a command to rotate the driving motor 12 in the judged direction of rotation to the motor drive controlling portion 19.

To that end, the clutch drive controlling portion 22 excites the exciting coil 33 of the electromagnetic clutch 30 so as to connect the adsorbed disc 31 to the adsorption rotor 32 (S-3), and rotates and drives the driving motor 12 in the direction as judged (S-4). Accordingly, the rotation of the driving motor 12 is transmitted to the output gear 17 via the worm 12*b*, the worm wheel 13, the input shaft 37 of the electromagnetic clutch 30, the adsorption rotor 32, the adsorbed disc 31, the power input shaft 38 of the speed reducing gear mechanism 46, the small gear 35, the large gear 36*a*, and the small gear 36*b* of the middle shaft 36 so as to rotate and drive the range controlling shaft 7 in a direction of an arrow C-D in FIG. 1 around a predetermined angle of rotation.

Then, the detent lever 5 rotates together with the arm portion 5*b* in the direction of the arrow C-D at a predetermined angle, and the pin 5*a* rotates together with the arm portion 5*b* in the direction of the arrow C-D at a predetermined angle. When the pin 5*a* rotates in the direction of the arrow C-D at the predetermined angle, a position of the pin 5*a* in a direction of an arrow A-B in FIG. 3 is changed in correspondence to an amount of rotational angle in a direction of an arrow C-D. Accordingly, a spool of the manual valve 2 engaged with the pin 5*a* via the engaging groove 2*c* is moved and driven in the direction of the arrow A-B at the same amount as a moving amount in the direction of the arrow A-B of the pin 5*a*, and the range of the manual valve 2 is sequentially switched to the P, R, N, D and Ds ranges from the side of the arrow A in FIG. 1.

Figure 4:
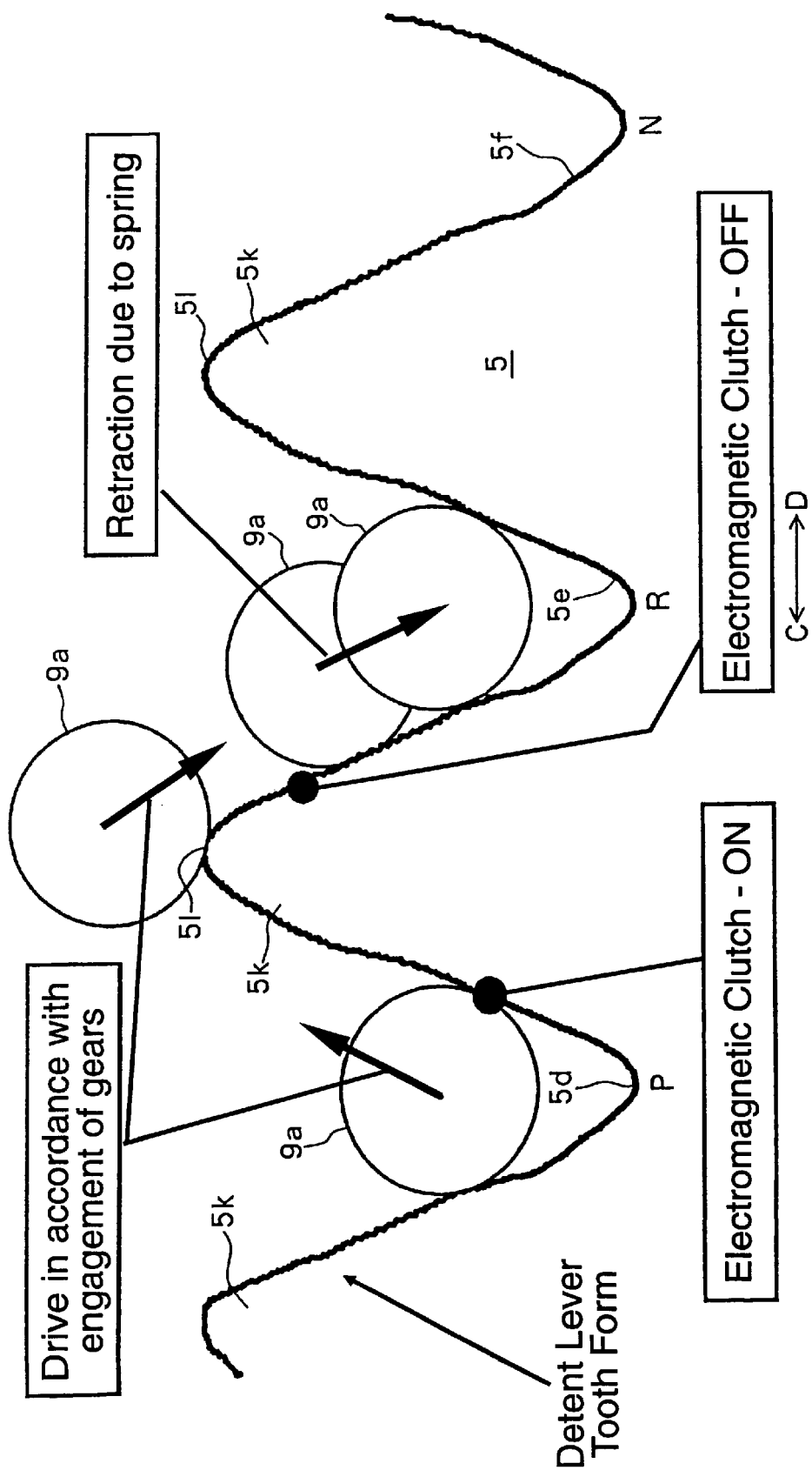
FIG. 4 is an enlarged view showing details of an engagement state between the detent lever and a detent spring.

For example, in the case of switching the range from the range P to the range R, the roller 9*a* of the detent spring 9 fitted to and engaged with the range engagement groove 5*d*, of the detent lever 5 rotated and driven in the direction of an arrow C via the range controlling shaft 7 by the driving motor 12, starts moving upward in the figure on a projection 5*k* from the range engagement groove 5*d* toward the range engagement groove 5*e* in such a manner as to resist an elasticity of the detent spring 9 as shown in FIG. 3. While the driving motor 12 is rotated and driven in this manner, the roller 9*a* of the detent spring 9 becomes in a state that a movement closer to a side of the range engagement groove 5*e* than to a top portion 51 of the projection 5*k* is completed as shown in FIG. 4. The shift motion controlling portion 20 always detects the position of the detent lever 5 via the range controlling shaft 7 by the position sensor 21 (S-5). Since the position of the roller 9*a* of the detent spring 9 in the direction of the arrow C-D in FIG. 4 with respect to the detent lever 5 is fixed, the shift motion controlling portion 20 can easily detect from the output of the position sensor 21 a state in which the roller 9*a* of the detent spring 9 has finished moving closer to the side of the range engagement groove 5*e* than to the top portion 51 of the projection 5*k*.

When the state in which the roller 9*a* of the detent spring 9 has finished moving closer to the side of the range engagement groove 5*e* than to the top portion 51 of the projection 5*k* is detected, the shift motion controlling portion 20 gives a command to disengage the electromagnetic clutch 30 to the clutch drive controlling portion 22 (S-6), and gives a command to stop the driving motor 12 to the motor drive controlling portion 19.

To that end, the clutch drive controlling portion 22 immediately cancels the excitation of the exciting coil 33 of the electromagnetic clutch 30 (S-7), and cancels the adsorption and connection state between the adsorption rotor 32 and the adsorbed disc 31 so as to prevent the driving force from the driving motor 12 from being transmitted to the power input shaft 38 of the speed reducing gear mechanism 46, and the motor drive controlling portion 19 stops the rotation of the driving motor 12 (S-8). Accordingly, the rotational force from the driving motor 12 is not transmitted to the side of the outputting gear 17 thereafter, and the driving mechanism from the power input shaft 38 of the speed reducing gear mechanism 46 to the middle shaft 36, the output gear 17 and the detent lever 5, disposed on the downstream side of the adsorbed disc 31 of the electromagnetic clutch 30 becomes in a free rational state as far as any positioning motion is not executed.

In this state, a moment of rotation for rotating the detent lever 5 in the direction of the arrow C is applied to the detent lever 5 from the roller 9*a* of the detent spring 9 moving upward in FIG. 4 in such a manner as to resist its own elasticity, and the detent lever 5 rotates in the direction of the arrow C at a predetermined angle in such a manner as to fit the roller 9*a* of the detent spring 9 into the engagement groove 5*e*. When the roller 9*a* is fitted into the engagement groove 5*e*, the detent lever 5 is positioned and kept at the predetermined position, that is, the R range position, by the detent spring 9. In this case, it is confirmed by the position sensor 21 whether or not the range finally reaches the target range (S-9), and if it is the target range, the operation is finished as it is, and if the range is different from the target range, the range switching apparatus is again controlled so that the target range is achieved.

At this time, an inertia force is applied to the adsorption rotor 32 of the electromagnetic clutch 30 having a comparatively large mass in comparison with the adsorbed disc 31 even after the operation of the driving motor 12 is stopped, thereby trying to keep the rotation, however, since the adsorption rotor 32 is connected to the side of the driving motor 12 via the input shaft 37, the inertia force is not applied in the direction of rotating the detent lever 5 so the positioning of the detent lever 5 is executed by the detent spring 9 in a proper state without generating overrun due to the inertia force of the adsorption rotor 32. Further, since the adsorption rotor 32 and the driving motor 12 are connected via the reverse rotation preventing mechanism constituted by the worm wheel 13 and the worm 12*b*, the rotation of the adsorption rotor 32 due to the inertia force can be properly prevented by the reverse rotation preventing mechanism.

Even in the case where the target shift position is not the R range but the next N or D range, or the like, the driving motor 12 is continuously rotated and driven until the shift motion controlling portion 20 detects by the position sensor 21 the state in which the roller 9*a* of the detent spring 9 has finished moving closer to the side of the range engagement grooves 5f and 5g than to the top portion 51 of the projection 5k immediately before the range engagement groove corresponding to the target shift position. Accordingly, the output gear 17 further rotates in the direction of the arrow C in FIG. 1, the range controlling shaft 7 rotates together with the detent lever 5 in the direction of the arrow C, and the roller 9a of the detent spring 9 moves on the projection 5k toward the direction of the range engagement groove 5f from the range engagement groove 5e, and is further moved and driven by the driving motor 12 toward the range engagement groove corresponding to the target shift position.

In this way, when the state in which the roller 9a of the detent spring 9 has finished moving closer to the side of the range engagement groove 5f or 5g or 5h than to the top portion 51 of the projection 5k immediately before the range engagement groove corresponding to the target shift position is detected, the shift motion controlling portion 20 gives a command to disengage the electromagnetic clutch 30 to the clutch drive controlling portion 22 and gives a command to stop the driving motor 12 to the motor drive controlling portion 19, in the same manner as mentioned above.

To that end, the clutch drive controlling portion 22 immediately cancels the excitation of the exciting coil 33 of the electromagnetic clutch 30, and cancels the adsorption and connection state between the adsorption rotor 32 and the adsorbed disc 31 so as to make the driving mechanism from the power input shaft 38 of the speed reducing gear mechanism 46 to the middle shaft 36, the output gear 17 and the detent lever 5, disposed on the downstream side of the adsorbed disc 31 of the electromagnetic clutch 30 in a free rotational state.

Further, the roller 9a is fitted into the engagement groove in such a manner as to rotate the detent lever 5 in the direction of the arrow C by the roller 9a of the detent spring 9 moving upward in FIG. 4 in a state of resisting its own elasticity. Accordingly, the detent lever 5 is positioned and kept at the range position corresponding to the shift position by the detent spring 9.

As well, it is exactly the same when reverse rotating the driving motor 12 so as to switch the range in the direction of D→N→R→P.

Further, in the case that the driving motor 12 breaks down for some reason and the rotation can not be executed, when the shift position is selected, the electromagnetic clutch 30 is in a disengaged state and the connection between the driving motor 12 and the detent lever 5 is canceled so that the manual valve 2 can be operated by appropriate means such as manual operation or the like via the range controlling shaft 7 and the detent lever 5 in a state of disengaging the driving motor 12.

Next, a description will be given of a range switching apparatus 101 in accordance with a second embodiment shown in FIG. 6. The range switching apparatus 1 in accordance with the first embodiment is structured such that the input shaft 37 provided in the adsorption rotor 32 is a hollow shaft and the power input shaft 38 provided in the adsorbed disc 31 is a solid shaft. Conversely, the range switching apparatus 101 in accordance with the second embodiment is structured such that an input shaft 137 provided in an adsorption rotor 132 is a solid shaft and a power input shaft 138 provided in the adsorbed disc 31 is a hollow shaft. Accordingly, since the range switching apparatus 101 in accordance with the second embodiment basically has the same motion as that of the range switching apparatus 1 in accordance with the first embodiment, the same reference numerals are attached to the same elements, reference numerals obtained by adding a "1" in front of the reference numerals in the first embodiment are attached to elements having substantially the same functions but having different shapes, and a description of a part of the structures and the motion thereof will be omitted.

Figure 6:
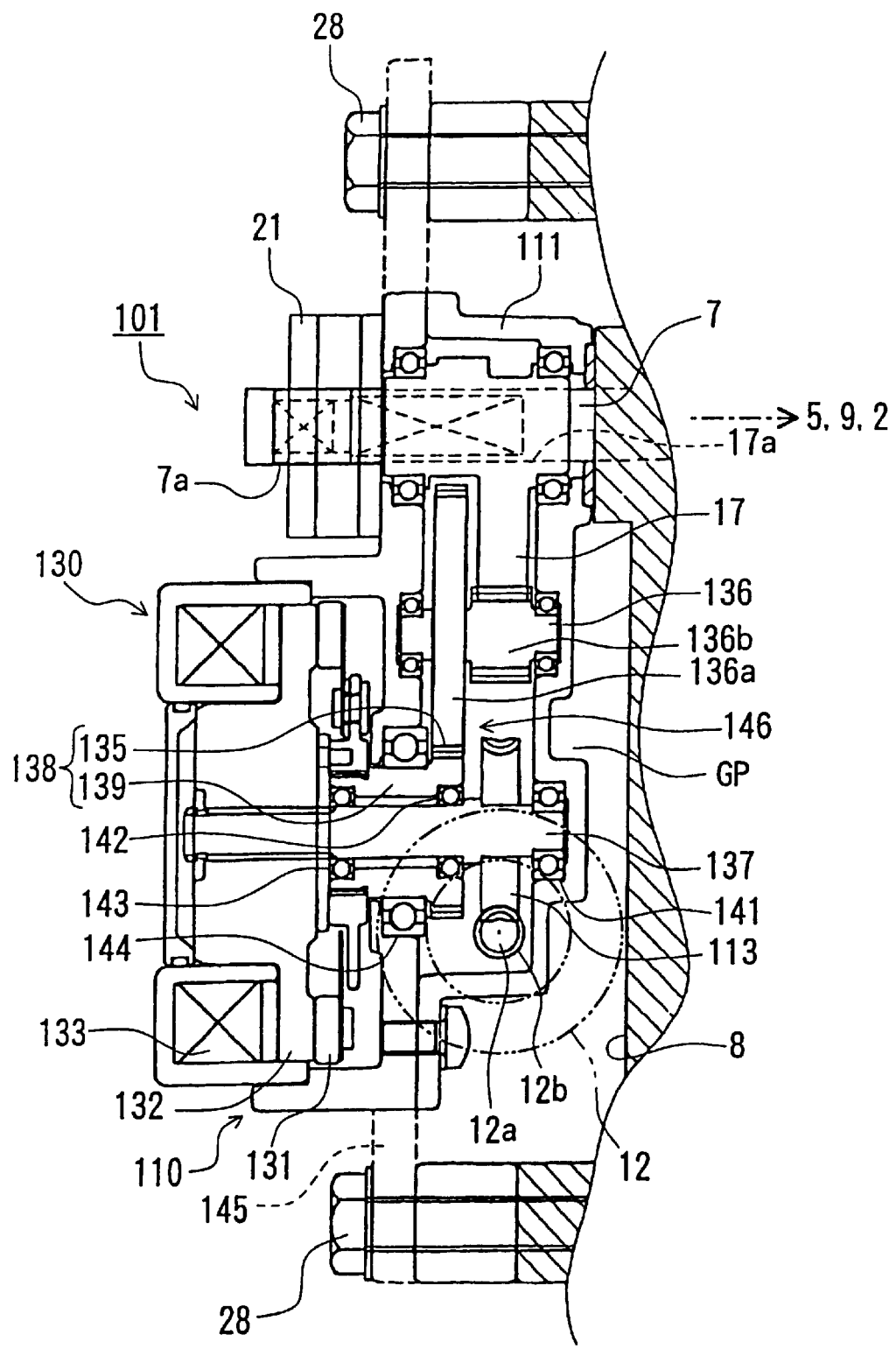
FIG. 6 is a front view showing an example of a driving portion of a range switching apparatus in accordance with another embodiment.

A valve driving apparatus 110 has a casing 111 formed in a box shape as shown in FIG. 6. The driving motor 12 is attached to the casing 111. The worm 12b is attached to the output shaft 12a of the motor 12.

A power input member 138 of a speed reducing gear mechanism 146 is formed to be hollow. The power input member 138 is formed by a hollow connection shaft 139 and an input gear 135. The connection shaft 139 is rotatably supported in the casing 111 by a bearing 144 and has a small gear 135 at one end.

An input shaft 137 is inserted into the power input member 138 so as to be arranged in a telescopic manner and a concentric manner and is rotatably supported by bearings 142 and 143. An adsorption rotor 132 constituting an electromagnetic clutch 130 is provided at the left end in FIG. 6 of the input shaft 137 in such a manner as to be spline connected. An exciting coil 133 is provided on an outer peripheral portion of the adsorption rotor 132.

A worm wheel 113 engaged with the worm 12b is arranged in a right end in FIG. 6 of the input shaft 137. A right end of the input shaft 137 is rotatably supported to the casing 111 by a bearing 141. Accordingly, the bearings 141, 142 and 143 are arranged in both sides of the worm wheel 113. Among two bearings 142 and 143 provided on an inner periphery of the connection shaft 139, one bearing 142 is arranged at a position overlapping with the input gear 135 in an axial direction.

The casing 111 is supported by a supporting plate 145 between the input gear 135 and the adsorbed disc 131 and attached to the cover 8 of the automatic transmission.

The valve driving apparatus 110 including the electromagnetic clutch 30 is arranged via a gap GP with respect to the cover 8 of the automatic transmission, as shown in FIG. 6, thereby eliminating influence of heat generated by the automatic transmission and transmitted from the cover 8.

The range switching apparatuses 1 and 101 mentioned above have the speed reducing gear mechanisms 46 and 146. However, the speed reducing gear mechanism is not required depending on the rotation speed of the driving motor 12 or the gear ratios between the worm 12b and the worm wheels 13 and 113.

A description will be given of a structure of a range switching apparatus provided with no speed reducing gear mechanism. This structure is not illustrated, however, FIGS. 2 and 6 can be used for describing the structure for reference. Accordingly, this range switching apparatus is provided with the disc 2b, the engagement groove 2c, the pin 5a and the arm portion 5b which are provided for switching the range, the driving motor 12 for driving the disc 2b, the engagement groove 2c, the pin 5a and the arm portion 5b, and the electromagnetic clutches 30 and 130 for engaging and disengaging the power transmission state between the driving motor 12 and the disc 2b, the engagement groove 2c, the pin 5a and the arm portion 5b. Further, the electromagnetic clutch 30 and 130 have the adsorbed discs 31 and 131 and the adsorption rotors 32 and 132 having a greater mass than that of the adsorbed discs 31 and 131, and are structured such that the adsorbed discs 31 and 131 are provided on the side of the disc 2b, the engagement groove 2c, the pin 5a and the arm portion 5b, and the adsorption rotors 32 and 132 are provided on the side of the driving means. Further, the position detecting sensor 21 is structured such as to detect the range switching position of the disc 2b, the engagement groove 2c, the pin 5a and the arm portion 5b between the disc 2b, the engagement groove 2c, the pin 5a and the arm portion 5b and the electromagnetic clutches 30 and 130. Since a motion of the range switching apparatus in accordance with this embodiment is substantially the same as that of the range switching apparatuses in accordance with the first and second embodiments, a description will be omitted.

The range switching apparatus provided with no speed reducing gear mechanism further has the following structure. This range switching apparatus is not illustrated, however, the structure will be described using FIGS. 2 and 6 for reference. Accordingly, this range switching apparatus is provided with the disc 2b, the engagement groove 2c, the pin 5a and the arm portion 5b, which are provided for switching the range, the driving motor 12 for driving the disc 2b, the engagement groove 2c, the pin 5a, and the arm portion 5b, the electromagnetic clutches 30 and 130 for engaging and disengaging the power transmission state between the disc 2b, the engagement groove 2c, the pin 5a, and the arm portion 5b and the driving motor 12, and the position detecting sensor 21 for detecting the range switching positions of the disc 2b, the engagement groove 2c, the pin 5a, and the arm portion 5b between the disc 2b, the engagement groove 2c, the pin 5a, and the arm portion 5b and the electromagnetic motors 30 and 130. Further, the disc 2b, the engagement groove 2c, the pin 5a, and the arm portion 5b are structured such as to drive the manual valve 2, however, there is also a structure having no manual valve and in which the parking condition is engaged or disengaged by a motor. Since a motion of the range switching apparatus in accordance with this embodiment is substantially the same as that of the range switching apparatuses in accordance with the first and second embodiments, a description will be omitted.

Further, as the shift range operating means, as far as it can output an intention of switching the range by the driver as an electric signal, various kinds of forms such as a shift button, a shift switch, a rotary switch, a voice input unit and the like can be employed in addition to the shift lever 25 shown in FIG. 1.

INDUSTRIAL APPLICABILITY

As mentioned above, the range switching apparatus in accordance with the present invention is useful as a switching apparatus of the automatic transmission in a motor vehicle such as a passenger car, a truck, a bus or the like, and is particularly suitable for being used as a switching apparatus in an automatic transmission in a motor vehicle in which compactness is required.

What is claimed is:

1. A range switching apparatus, comprising:
    range switching means for switching a range;
    driving means for driving said range switching means;
    speed reducing means for reducing a drive force of said driving means and transmitting the drive force to said range switching means; and
    a clutch for connecting and disconnecting a power transmitting state between said driving means and said speed reducing means, wherein a power output member of said clutch is connected to a power input member of said speed reducing means.

2. The range switching apparatus according to claim 1, further comprising a position detecting sensors for detecting a range switching position of said range switching means between said range switching means and said speed reducing means.

3. The range switching apparatus according to claim 2, wherein said position detecting sensor detects a motion of the power output member in said speed reducing means.

4. The range switching apparatus according to claim 2, wherein said clutch is an electromagnetic clutch having an adsorbed disc and an adsorption rotor with a mass greater than that of said adsorbed disc, the power output member of said clutch is made said adsorbed disc, and the power input member of said clutch is made said adsorption rotor.

5. The range switching apparatus according to claim 2, wherein said position detecting sensor detects a motion of the power input member of said range switching means.

6. The range switching apparatus according to claim 5, wherein said range switching means is provided with a detent mechanism for holding at each position corresponding to said range.

7. The range switching apparatus according to claim 2, further comprising:
    range selecting means for selecting said range; and
    range switching control means for operating and controlling said driving means and said clutch so as to make said range switching means execute a switching operation, thereby switching to a range selected by said range selecting means when a range switching position according to said range switching means which is detected by said position detecting sensor is different from a range selected by said range selecting means.

8. The range switching apparatus according to claim 1, wherein said clutch is an electromagnetic clutch having an adsorbed disc and an adsorption rotor with a mass greater than that of said adsorbed disc, the power output member of said clutch is made said adsorbed disc, and the power input member of said clutch is made said adsorption rotor.

9. The range switching apparatus according to claim 1, wherein a casing of the apparatus is mounted to the automatic transmission, and said clutch is arranged in a cover of the automatic transmission at a predetermined interval.

10. The range switching apparatus according to claim 1, wherein said driving means is a driving motor, and is provided with a worm connected to said driving motor and a worm wheel connected to the power inputting member of said clutch in an engaged state.

11. The range switching apparatus according to claim 1, wherein the power input member of said speed reducing means is formed to be hollow and is rotatably supported in said casing, and an input shaft of said clutch having the power input member of said clutch is inserted into said power input member.

12. The range switching apparatus according to claim 1, wherein said range switching means operates a switching valve for switching a shift range of said automatic transmission.

13. The range switching apparatus according to claim 1, wherein the power inputting member of said clutch is connected to a hollow input shaft rotatably supported in said casing, and the power inputting member of said speed reducing means is inserted into said input shaft.

14. The range switching apparatus according to claim 13, wherein the power input member of said speed reducing means is rotatably supported in said input shaft, and one end of said power input member is rotatably supported in said casing.

15. The range switching apparatus according to claim 14, wherein the power input member of said speed reducing means has an input gear and a connection shaft, said connection shaft has said input gear at one end and is supported in said casing and said input shaft at both ends by supporting members, one supporting member is arranged at one end of said connection shaft and supported in said casing, and another supporting member is supported in said input shaft.

16. The range switching apparatus according to claim 15, wherein said input shaft has a worm wheel at one end and is supported in said casing.

17. The range switching apparatus according to claim 16, wherein one supporting member among a plurality of supporting members of said connection shaft is arranged at a position overlapping with the worm wheel.

18. The range switching apparatus according to claim 16, wherein the power input member of said clutch is positioned at an end portion of said input shaft, and is supported in said casing at a position between the power input member of said clutch and said worm wheel.

19. The range switching apparatus according to claim 1, wherein the power input member of said speed reducing means is formed to be hollow and is rotatably supported in said casing, and an input shaft of said clutch having the power input member of said clutch is inserted into said power input member.

20. The range switching apparatus according to claim 19, wherein the input shaft of said clutch is rotatably supported in the power input member of said speed reducing means, and one end of the input shaft of said clutch is rotatably supported in said casing.

21. The range switching apparatus according to claim 20, wherein the input shaft of said clutch has a worm wheel arranged at one end and supporting members arranged on both sides of the worm wheel, a supporting member on one side is supported in said casing, and another supporting member is supported in the power input member of said speed reducing means.

22. The range switching apparatus according to claim 21, wherein the power input member of said speed reducing means has a hollow connection shaft and an input gear, and said connection shaft has said input gear at one end, is supported in said casing by a supporting member, and has a plurality of supporting members supporting said input shaft on an inner periphery.

23. The range switching apparatus according to claim 22, wherein one supporting member among a plurality of supporting members provided on the inner periphery of the connection shaft of said speed reducing means is arranged at a position overlapping with said input gear.

24. A range switching apparatus according to claim 23, wherein the connection shaft of said speed reducing means has an input gear at one end portion, has a power output member of said clutch at another end portion, and is supported in said casing at a position between said input gear and said power output member of said clutch.

25. The range switching apparatus according to claim 5, wherein a casing of the apparatus is mounted to the automatic transmission, and said clutch is arranged in a cover of the automatic transmission at a predetermined interval.

26. The range switching apparatus according to claim 5, wherein said driving means is a driving motor, and is provided with a worm connected to said driving motor and a worm wheel connected to the power inputting member of said clutch in an engaged state.

27. The range switching apparatus according to claim 5, wherein said range switching means operates a switching valve for switching a shift range of said automatic transmission.

28. A range switching apparatus, comprising:
range switching means for switching a range;
driving means for driving said range switching means; and
a clutch for connecting and disconnecting a power transmitting state between said driving means and said range switching means, wherein said clutch has an adsorbed disc and an adsorption rotor having a mass greater than that of said adsorbed disc, said adsorbed disc is provided on said range switching means side, and said adsorption rotor is provided on said driving means side.

29. The range switching apparatus according to claim 28, further comprising a position detecting sensor for detecting a range switching position of said range switching means between said range switching means and said clutch.

30. The range switching apparatus according to claim 29, wherein said position detecting sensor detects a motion of the power input member of said range switching means.

31. The range switching apparatus according to claim 30, wherein said range switching means is provided with a detent mechanism for holding at each position corresponding to said range.

32. The range switching apparatus according to claim 29, further comprising:
range selecting means for selecting said range; and
range switching control means for operating and controlling said driving means and said clutch so as to make said range switching means execute a switching operation, thereby switching to a range selected by said range selecting means when a range switching position according to said range switching means which is detected by said position detecting sensor is different from a range selected by said range selecting means.

33. A range switching apparatus, comprising:
range switching means for switching a range;
driving means for driving said range switching means;
a clutch for connecting and disconnecting a power transmitting state between said range switching means and said driving means; and
a position detecting sensor for detecting a range switching position of said range switching means between said range switching means and said clutch.

34. The range switching apparatus according to claim 33, wherein said position detecting sensor detects a motion of the power input member of said range switching means.

35. The range switching apparatus according to claim 34, wherein said range switching means is provided with a detent mechanism for holding at each position corresponding to said range.

36. The range switching apparatus according to claim 33, further comprising:
range selecting means for selecting said range; and
range switching control means for operating and controlling said driving means and said clutch so as to make said range switching means execute a switching operation, thereby switching to a range selected by said range selecting means when a range switching position according to said range switching means which is detected by said position detecting sensor is different from a range selected by said range selecting means.

37. The range switching apparatus according to claim 33, here in a casing of the apparatus is mounted to the automatic transmission, and said clutch is arranged in a cover of the automatic transmission at a predetermined interval.

38. The range switching apparatus according to claim 33, wherein said driving means is a driving motor, and is provided with a worm connected to said driving motor and a worm wheel connected to the power inputting member of said clutch in an engaged state.

39. The range switching apparatus according to claim 33, wherein said range switching means operates a switching valve for switching a shift range of said automatic transmission.

* * * * *